(12) United States Patent
Tokunaga et al.

(10) Patent No.: US 10,339,602 B2
(45) Date of Patent: Jul. 2, 2019

(54) POWER ADJUSTMENT SYSTEM, POWER ADJUSTMENT METHOD, AND COMPUTER PROGRAM

(71) Applicant: Panasonic Intellectual Property Management Co., Ltd., Osaka (JP)

(72) Inventors: Yoshihiko Tokunaga, Hyogo (JP); Seiichi Miyazaki, Osaka (JP); Naohiro Fukuda, Chiba (JP); Hiroyuki Kuriyama, Kanagawa (JP); Norimasa Ota, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 310 days.

(21) Appl. No.: 14/910,524

(22) PCT Filed: Jul. 31, 2014

(86) PCT No.: PCT/JP2014/004016
§ 371 (c)(1),
(2) Date: Feb. 5, 2016

(87) PCT Pub. No.: WO2015/019585
PCT Pub. Date: Feb. 12, 2015

(65) Prior Publication Data
US 2016/0189298 A1    Jun. 30, 2016

(30) Foreign Application Priority Data
Aug. 9, 2013  (JP) ................................. 2013-166523

(51) Int. Cl.
*G06Q 40/04* (2012.01)
*G06Q 40/00* (2012.01)
(Continued)

(52) U.S. Cl.
CPC ............. *G06Q 40/04* (2013.01); *G06Q 10/04* (2013.01); *G06Q 30/0206* (2013.01);
(Continued)

(58) Field of Classification Search
CPC ......... G06Q 40/04; G06Q 40/00; G06Q 40/06
(Continued)

(56) References Cited

U.S. PATENT DOCUMENTS

| 8,457,802 B1 * | 6/2013 | Steven | ................... G06Q 10/00 700/291 |
|---|---|---|---|
| 9,124,099 B2 | 9/2015 | Kuriyama | |

(Continued)

FOREIGN PATENT DOCUMENTS

| JP | 2000-224769 A | 8/2000 |
|---|---|---|
| JP | 2002-233053 A | 8/2002 |

(Continued)

OTHER PUBLICATIONS

International Search Report issued in Application No. PCT/JP2014/004016 dated Sep. 16, 2014 with English translation.
(Continued)

*Primary Examiner* — Hai Tran
(74) *Attorney, Agent, or Firm* — McDermott Will & Emery LLP

(57) ABSTRACT

A first estimator estimates first power to be generated by a photovoltaic power generation apparatus during an interested period. A second estimator estimates second power to be consumed by an electric load during the interested period. A power purchasing cost calculator calculates, when there is a shortfall in the first power compared to the second power, a cost to be paid for receiving, from a power grid, power for compensating for the shortfall. A determiner compares an amount of money to be paid to a customer facility in accordance with a trading term when power is supplied from
(Continued)

the power storage apparatus to the power grid, with the cost calculated by the power purchasing cost calculator. A controller causes the power storage apparatus to the electric load when the cost to be paid to the customer facility is equal to or less than the cost.

6 Claims, 6 Drawing Sheets

(51) Int. Cl.
*G06Q 40/06* (2012.01)
*G06Q 50/06* (2012.01)
*H02J 3/32* (2006.01)
*H02J 3/38* (2006.01)
*H02J 13/00* (2006.01)
*G06Q 10/04* (2012.01)
*G06Q 30/02* (2012.01)
*G06Q 30/06* (2012.01)

(52) U.S. Cl.
CPC .............. *G06Q 30/06* (2013.01); *G06Q 50/06* (2013.01); *H02J 3/32* (2013.01); *H02J 3/383* (2013.01); *H02J 13/0079* (2013.01); *Y02E 10/563* (2013.01); *Y02E 10/566* (2013.01); *Y02E 40/72* (2013.01); *Y02E 60/722* (2013.01); *Y02E 70/30* (2013.01); *Y02P 90/90* (2015.11); *Y04S 10/123* (2013.01); *Y04S 10/14* (2013.01); *Y04S 10/58* (2013.01); *Y04S 50/10* (2013.01); *Y04S 50/14* (2013.01)

(58) Field of Classification Search
USPC .......................................................... 705/37
See application file for complete search history.

(56) References Cited

U.S. PATENT DOCUMENTS

| | | | |
|---|---|---|---|
| 2011/0046806 A1* | 2/2011 | Nagel | H04L 67/125 700/291 |
| 2011/0055036 A1* | 3/2011 | Helfan | G06Q 30/04 705/26.1 |
| 2012/0306271 A1* | 12/2012 | Kuriyama | H02J 9/00 307/23 |
| 2013/0013123 A1 | 1/2013 | Ozaki | |
| 2014/0035374 A1 | 2/2014 | Oka | |

FOREIGN PATENT DOCUMENTS

| | | |
|---|---|---|
| JP | 2003-189477 A | 7/2003 |
| JP | 2006-280154 A | 10/2006 |
| JP | 2011-130618 A | 6/2011 |
| JP | 2012-023872 A | 2/2012 |
| JP | 2012-053721 A | 3/2012 |
| JP | 2012-060761 A | 3/2012 |
| JP | 2012-095397 A | 5/2012 |
| JP | 2012-200065 A | 10/2012 |
| JP | 2012-210073 A | 10/2012 |
| JP | 2012-222860 A | 11/2012 |
| JP | 2012-228103 A | 11/2012 |
| JP | 2012-253940 A | 12/2012 |

OTHER PUBLICATIONS

Extended European Search Report issued in corresponding European Patent Application No. 14835226.3, dated Jun. 30, 2016.

* cited by examiner

FIG. 2

| INTERESTED PERIOD | ENERGY | PRICE (UNIT PRICE) |
|---|---|---|
| P1 | W1 | V1 |
| P2 | W2 | V2 |
| ⋮ | ⋮ | ⋮ |
| Pn | Wn | Vn |

FIG. 3

| INTERESTED PERIOD | 1 | 2 | 3 | .. .. | n |
|---|---|---|---|---|---|
| 00:00~00:30 | 5.03 | 7.45 | 9.00 | | |
| | 20 | 12 | 5 | | |
| 00:30~01:00 | 8.87 | | | | |
| | 20 | | | | |
| 01:00~01:30 | 8.50 | | | | |
| | ▲20 | | | | |
| ⋮ | ⋮ | | | | |

FIG. 4

PARTICIPATOR "A"

| INTERESTED PERIOD | 1 | 2 | 3 | ·· ·· | n |
|---|---|---|---|---|---|
| 14:00~14:30 | 7.00 | 8.50 | 9.00 | | |
| | 13 | 7 | 5 | | |

PARTICIPATOR "B"

| INTERESTED PERIOD | 1 | 2 | | ·· ·· | n |
|---|---|---|---|---|---|
| 14:00~14:30 | 7.50 | 8.10 | | | |
| | 15 | 6 | | | |

PARTICIPATOR "C"

| INTERESTED PERIOD | 1 | 2 | 3 | ·· ·· | n |
|---|---|---|---|---|---|
| 14:00~14:30 | 7.00 | 7.20 | 9.00 | | |
| | ▲7 | ▲12 | ▲25 | | |

FIG. 5

TOTAL OF PARTICIPATORS "A" AND "B"

| UNIT PRICE (YEN) | 7.00 | 7.50 | 8.10 | 8.50 | 9.00 |
|---|---|---|---|---|---|
| PARTICIPATOR "A" | 13 | 7 | 7 | 7 | 5 |
| PARTICIPATOR "B" | 15 | 15 | 6 | 0 | 0 |
| TOTAL | 28 | 22 | 13 | 7 | 5 | ns, power adjustment methods for the power adjustment# POWER ADJUSTMENT SYSTEM, POWER ADJUSTMENT METHOD, AND COMPUTER PROGRAM

RELATED APPLICATIONS

This application is the U.S. National Phase under 35 U.S.C. § 371 of International Application No. PCT/JP2014/004016, filed on Jul. 31, 2014, which in turn claims the benefit of Japanese Application No. 2013-166523, filed on Aug. 9, 2013, the disclosures of which are incorporated by reference herein.

TECHNICAL FIELD

The invention relates generally to power adjustment systems, power adjustment methods for the power adjustment systems, and computer programs for realizing the power adjustment systems and, more particularly, to a power adjustment system configured to cause a power supply apparatus situated in a customer facility to supply power to a power grid, a power adjustment method for the power adjustment system, and a computer program for realizing the power adjustment system.

BACKGROUND ART

There has been known such a technique capable of allowing a storage battery to supply power to a power grid and an electric load (see for example, JP 2000-224769 A (hereinafter, referred to as "Document 1")). Document 1 mentions that a person of the customer facility buys power at a late-night rate to charge the storage battery and sells charged power to a power company at a daytime rate and thereby can earn income corresponding to a difference between the rates. Further, Document 1 mentions that supply of power from the storage battery to the power grid by the person of the customer facility can offer various benefits such as load leveling, responding to a sharp demand fluctuation, and improved power quality of a distribution line. Additionally, Document 1 mentions that the power company may give rewards for some of the benefits, to the person of the customer facility.

Document 1 mentions that the person of the customer facility can perform charging and discharging of the storage battery in the customer facility to provide benefits to the power company. However, benefits for the person of the customer facility disclosed in Document 1 are income corresponding to the difference between the power rates in charging and discharging, and the rewards for the benefits obtained by the power company. Document 1 does not give any teachings for further motivating the person of the customer facility to increase a profit thereof.

SUMMARY OF THE INVENTION

The objective of the present invention is to propose a power adjustment system capable of increasing a profit for supply of power to a power grid by the person of the customer facility including power storage apparatus, a power adjustment method for the power adjustment system, and a computer program for realizing the power adjustment system.

A power adjustment system according to an aspect of the present invention is configured to make a deal with a trading device about supplying power to a power grid from a power supply apparatus of a customer facility in accordance with a trade term. The power supply apparatus includes a power generation apparatus, and a power storage apparatus including a storage battery. The power adjustment system includes a first estimator, a second estimator, a purchasing power cost calculator, a controller, and a determiner. The first estimator is configured to estimate first power to be generated by the power generation apparatus during an interested period. The second estimator is configured to estimate second power to be consumed by an electric load of the customer facility during the interested period. The power purchasing cost calculator is configured to, when there is a shortfall in the first power estimated by the first estimator compared to the second power estimated by the second estimator, calculate a cost to be paid by the customer facility for receiving third power for compensating for the shortfall from the power grid. The controller is configured to select one of a first state of supplying power from the power storage apparatus to the power grid and a second state of supplying power from the power storage apparatus to the electric load. The determiner is configured to compare an amount of first money to be paid to the customer facility n accordance with the trade term when the first state is selected, with an amount of second money equal to the cost calculated by the power purchasing cost calculator. The controller is configured to select the second state when a comparison result made by the determiner indicates that the amount of the first money is equal to or less than the amount of the second money.

Desirably, the power adjustment system further includes a trade attender. The trade attender is configured to, when a comparison result made by the determiner indicates that the amount of the first money is greater than the amount of the second money, submit an offer to the trading device and receive from the trading device a determination result that indicates whether or not a contract is established. The controller is configured to select the first state when the contract is established.

In the power adjustment system, desirably, the power storage apparatus is configured to, before a start time of the interested period in which the shortfall in the first power compared to of the second power is expected, be charged so that an amount of remaining power thereof exceeds the third power.

In the power adjustment system, desirably, the first estimator is configured to receive, from a first measurement device, data on power generated by the power generation apparatus, and estimate power to be generated by the power generation apparatus during the interested period based on a temporal change in power measured with the first measurement device. The second estimator is configured to receive, from a second measurement device, data on power consumed by the electric load of the customer facility, and estimate power to be consumed by the electric load during the interested period based on a temporal change in power measured with the second measurement device.

In the power adjustment system, desirably, the power generation apparatus is composed of a photovoltaic power generation apparatus. The first estimator includes a weather information receiver, a first history storage, and a first classifier. The weather information receiver is configured to obtain information about a forecasted weather. The first history storage is configured to store the information obtained by the weather information receiver and a history of power generated by the photovoltaic power generation apparatus in association with each other. The first classifier is configured to create change patterns of power based on the history of power stored in the first history storage. The first estimator is configured to check data on a temporal change in power received from the first measurement device against the change patterns created by the first classifier to estimate power to be generated by the photovoltaic power generation apparatus during the interested period. The second estimator includes a second history storage, and a second classifier. The second history storage is configured to store a history of power consumed by the electric load. The second classifier is configured to create change patterns of power based on the history of power stored in the second history storage. The second estimator is configured to check data on a temporal change in power received from the second measurement device against the change patterns created by the second classifier to estimate power to be consumed by the electric load during the interested period.

A power adjusting method according to an aspect of the present invention is for making a deal with a trading device about supplying power to a power grid from a power supply apparatus of a customer facility in accordance with a trade term. The power supply apparatus includes a power generation apparatus, and a power storage apparatus including a storage battery. In the power adjusting method first power to be generated by the power generation apparatus during an interested period is estimated by a first estimator. Second power to be consumed by an electric load of the customer facility during the interested period is estimated by a second estimator. When there is a shortfall in the first power estimated by the first estimator compared to the second power estimated by the second estimator, a cost to be paid by the customer facility for receiving third power for compensating for the shortfall from the power grid is calculated by a power purchasing cost calculator. An amount of first money to be paid to the customer facility in accordance with the trade term when a first state of supplying power from the power storage apparatus to the power grid is selected, is compared by a determiner with an amount of second money equal to the cost calculated by the power purchasing cost calculator. When a comparison result made by the determiner indicates that the amount of the first money is equal to or less than the amount of the second money, a second state of supplying power from the power storage apparatus to the electric load is selected by a controller.

A computer program according to an aspect of the present invention is, when executed on a computer, cause the computer to function as any of the power adjustment systems. An aspect of the present invention is not limited to the computer program, but may be a computer readable recording medium.

BRIEF DESCRIPTION OF THE DRAWINGS

FIG. 2 is a diagram for illustrating a method how to determine a price according to the embodiment;
FIG. 3 is a diagram for illustrating a method how to determine a price according to the embodiment;
FIG. 4 is a diagram for illustrating an example of a trade according to the embodiment;
FIG. 5 is a diagram for illustrating the example of the trade according to the embodiment.

DESCRIPTION OF EMBODIMENTS

Figure 1:
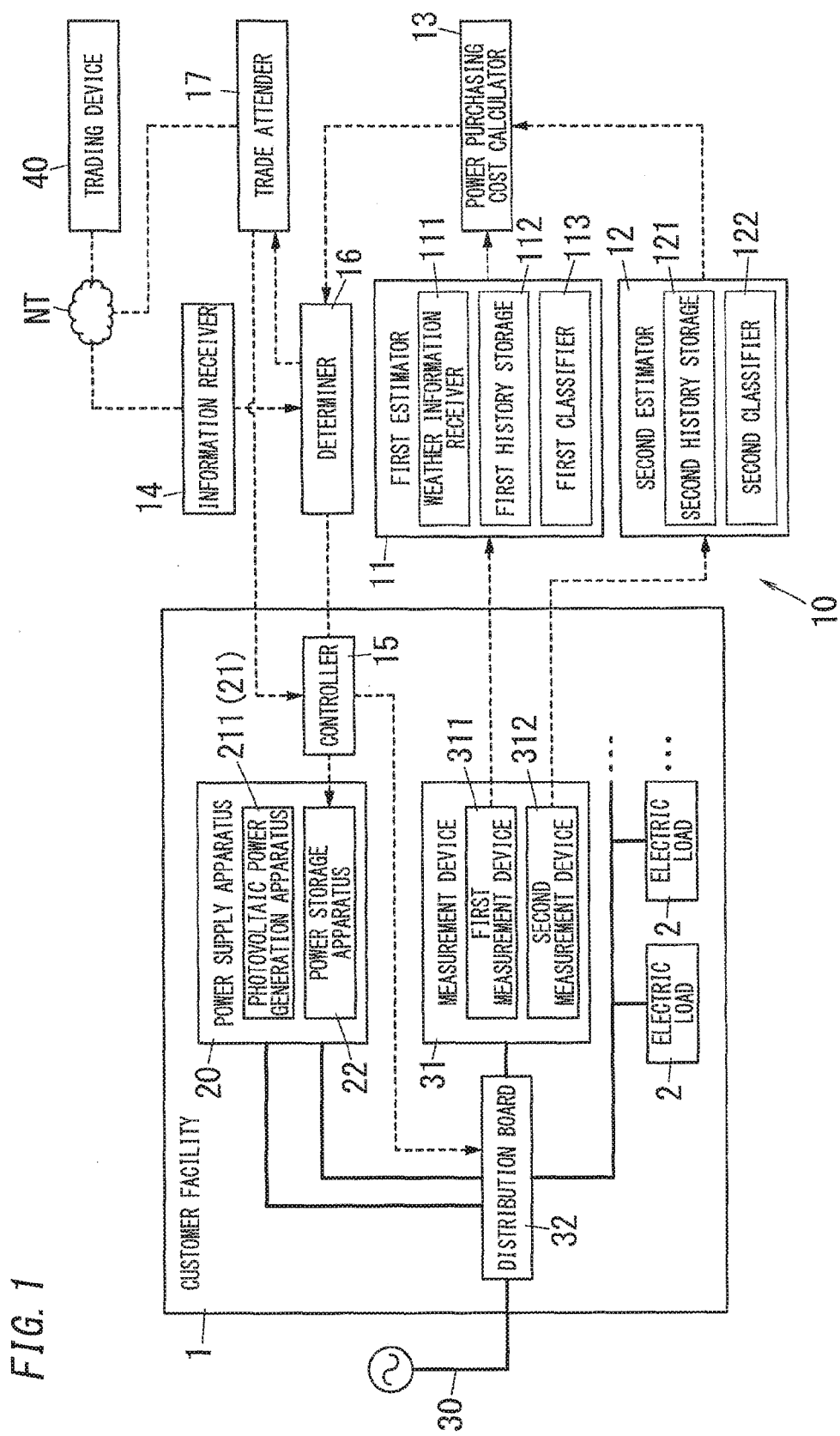
FIG. 1 is a block diagram according to an embodiment.

As shown in FIG. 1, a power adjustment system 10 described below is configured to make a deal with a trading device 40 about supplying power to a power grid 30 from a power supply apparatus 20 of a customer facility 1 in accordance with a trade term. The trading device 40 is constituted by a web-server managed by an electric utility or a cloud computing system, for example. The power supply apparatus 20 includes a power generation apparatus 21, and a power storage apparatus 22 including a storage battery. The power adjustment system 10 includes a first estimator 11, a second estimator 12, a power purchasing cost calculator 13, a controller 15, and a determiner 16. The power generation apparatus 21 can be selected from a photovoltaic power generation apparatus, a wind turbine generator system, a fuel cell, and the like. In the embodiment described below, the power generation apparatus 21 is composed of a photovoltaic power generation apparatus 211. Power defined in a trading term is either an instantaneous power (energy per unit time) or energy over a period in which power is required to be supplied.

The first estimator 11 is configured to estimate first power to be generated by the power generation apparatus 21 during an interested period. The second estimator 12 is configured to estimate second power to be consumed by an electric load 2 of the customer facility 1 during the interested period. The power purchasing cost calculator 13 is configured to, when there is a shortfall in the first power estimated by the first estimator 11 compared to the second power estimated by the second estimator 12, calculate a cost to be paid by the customer facility 1 for receiving, from the power grid 30, third power for compensating for the shortfall.

The controller 15 is configured to select one of a first state of supplying power from the power storage apparatus 22 to the power grid 30 and a second state of supplying power from the power storage apparatus 22 to the electric load 30. The determiner 16 is configured to compare an amount of first money to be paid to the customer facility 1 in accordance with the trade term when the first state is selected, with an amount of second money equal to the cost calculated by the power purchasing cost calculator 13. The controller 15 is configured to select the second state when a comparison result made by the determiner 16 indicates that the amount of the first money is equal to or less than the amount of the second money to compensate for the third power. In other words, when the determiner 16 determines that the amount of the first money is equal to or less than the amount of the second money, the controller 15 controls the power supply apparatus 20 so that the power supply apparatus 20 operates in the second state.

The power adjustment system of the present embodiment has an advantage of capable of increasing a profit given to a person of a customer facility in response to supply of power from a customer facility including power supply apparatus such as a storage battery to the power grid.

Preferably, the power adjustment system 10 further includes a trade attender 17 configured to, when a comparison result made by the determiner 16 indicates that the amount of the first money is greater than the amount of the second money, submit an offer to the trading device 40 and receive from the trading device 40 a determination result that indicates whether or not a contract is established. The controller 15 is configured to select the first state when the contract is established.

Preferably, the power storage apparatus 22 is, before a start time of the interested period in which the shortfall in the first power compared to the second power is expected, charged so that remaining power thereof exceeds the third power.

Preferably, the first estimator 11 is configured to receive, from a first measurement device 311, data on power generated by the power generation apparatus 21, and estimate power to be generated by the power generation apparatus 21 during the interested period based on a temporal change in power measured with the first measurement device 311. Preferably, the second estimator 12 is configured to receive, from a second measurement device 312, data on power consumed by the electric load 2 of the customer facility 1, and estimate power to be consumed by the electric load 2 during the interested period based on a temporal change in power measured with the second measurement device 312.

Preferably, the power generation apparatus 21 is composed of a photovoltaic power generation apparatus 211, and the first estimator 11 includes a weather information receiver 111, a first history storage 112, and a first classifier 113. The weather information receiver 111 is configured to obtain information about a forecasted weather. The first history storage 112 is configured to store the information obtained by the weather information receiver 111 and a history of power generated by the photovoltaic power generation apparatus 211 in association with each other. The first classifier 113 is configured to create change patterns of power based on the history of power stored in the first history storage 112. The first estimator 11 is configured to check data on a temporal change in power received from the first measurement device 311 against the change patterns created by the first classifier 113 to estimate power to be generated by the photovoltaic power generation apparatus 211 during the interested period.

The second estimator 12 includes a second history storage 121 and a second classifier 122. The second history storage 121 is configured to store a history of power consumed by the electric load 2. The second classifier 122 is configured to create change patterns of power based on the history of power stored in the second history storage 121. The second estimator 12 is configured to check data on a temporal change in power received from the second measurement device 312 against the change patterns created by the second classifier 122 to estimate power to be consumed by the electric load 2 during the interested period.

A power adjustment method described below is for making a deal with a trading device 40 about supplying power to a power grid 30 from a power supply apparatus 20 of a customer facility 1 in accordance with a trade term. In the power adjustment method, a first estimator 11 estimates first power to be generated by the power generation apparatus 21 during an interested period and a second estimator 12 estimates second power to be consumed by an electric load 2 of the customer facility 1 during the interested period. When there is a shortfall in the first power estimated by the first estimator 11 compared to the second power estimated by the second estimator 12, a power purchasing cost calculator 13 calculates a cost to be paid by the customer facility 1 for receiving, from the power grid 30, third power for compensating for the shortfall. A determiner 16 compares an amount of first money to be paid to the customer facility 1 in accordance with the trade term when a first state of supplying power from the power storage apparatus 22 to the power grid 30 is selected, with an amount of second money equal to the cost calculated by the power purchasing cost calculator 13. When a comparison result made by the determiner 16 indicates that the amount of the first money is equal to or less than the amount of the second money, a controller 15 selects a second state of supplying power from the power storage apparatus 22 to the electric load 2 to compensate for the third power.

A computer program described below causes, when executed on a computer, the computer to function as the power adjustment system 10. The computer program may be provided through a telecommunication network NT such as the Internet, or a computer readable storage medium.

The present embodiment is described hereinbelow in further detail. According to the present embodiment, the customer facility 1 includes the power supply apparatus 20, and receives power from the power grid 30. According to the present embodiment, one of the first and second states is selected. In the first state, power from the power supply apparatus 20 is supplied to the power grid 30. In the second state, the power from the power supply apparatus 20 is supplied to the electric loads 2 of the customer facility.

In the embodiment, the power supply apparatus 20 includes: the photovoltaic power generation apparatus 211 serving as the power generation apparatus 21; and the power storage apparatus 22 including the storage battery. The photovoltaic power generation apparatus 211 generates power using solar energy, and generating power thereof varies depending on the weather conditions such as the amount of solar radiation and the ambient temperature. The power storage apparatus 22 charges the storage battery by use of at least one of power received from the power grid 30 and power generated by the photovoltaic power generation apparatus 211. The photovoltaic power generation apparatus 211 and the power storage apparatus 22 each may include a power converter (not shown) for converting a direct-current power to an alternating-current power equivalent to an alternating-current power that the customer facility 1 receives from the power grid 30. The power storage apparatus 22 may include a capacitor having a high-capacitance, or a configuration for converting the electricity to another form of energy and storing it, in place of the storage battery.

It is assumed that the customer facility 1 is a hospital, a hotel, a factory or the like. However, the below described technique can be applied to a building that includes multiple customer facilities 1, such as a condominium, an office building, and a commercial building, provided that electricity of the whole building is managed collectively. In an example, distribution boards may be provided to the customer facilities, respectively, and a main distribution board for distributing power to each of whole units of the building may be provided to a building manager office or an electric room. Also, in a building that is adapted for collectively receiving power at high voltage, there is provided an electricity meter for the collective power receiving at high voltage as a measurement device 31. In this case, therefore, it is possible to measure the total power received by the building. The below described technique also can be applied to detached houses as customer facilities 1, provided that the customer facilities 1 in an area can be managed collectively as one aggregate and there is an electricity aggregator that manages respective power of the power storage apparatuses 22 of the customer facilities 1 collectively.

When the customer facility 1 is a hospital, a hotel, a factory, a condominium, an office building, a commercial building, or the like, an output power of the photovoltaic power generation apparatus 211 is 100 kW or more, and a capacitance of the power storage apparatus 22 is 100 kWh or more. The capacitance of the power storage apparatus 22 may be greater than 1000 kWh. Also, in an area where multiple detached houses exist, there can be provided a power supply apparatus 20 with a large capacitance and for being shared by the multiple detached houses.

In the case where the multiple customer facilities 1 in one aggregate share the power supply apparatus 20, desirably, there exists a service provider that collectively manages the multiple customer facilities 1 so that the electric utility for supplying power to the multiple customer facilities 1 can treat the multiple customer facilities 1 in the aggregate collectively as one customer facility 1. Such a kind of service provider supplies various services to the multiple customer facilities 1 in the aggregate on behalf of the electric utility that performs a power generation business. An example of the service provider is a demand response service provider including an electricity aggregator.

The electric utility may be an electricity utility selected from a general electricity utility (power company), an independent power producer, a specified electricity utility, a power producer and supplier, and the like, or may be a service provider that does not perform a power generation business but purchases power from another company to sell the purchased power to customer facilities 1.

When the customer facility 1 is a detached house, an output power of the photovoltaic power generation apparatus 211 is 1 kW to 5 kW, and a capacitance of the power storage apparatus 22 is around a range of 1 kWh to 10 kWh. However, the below described technique also can be applied to such a small-scale photovoltaic power generation apparatus 211 and power storage apparatus 22, as long as an electricity trade is allowed to be conducted.

The customer facility 1 includes, in addition to the electric loads 2 that consume power, the photovoltaic power generation apparatus 211 and the power storage apparatus 22 allowed to supply power to the power grid 30, as described above. Also, the customer facility is provided with a distribution board 32. The power grid 30, the photovoltaic power generation apparatus 211, the power storage apparatus 22, and the electric loads 2 are connected to the distribution board 32. The distribution board 32 includes a main circuit (not shown) for receiving power from the power grid 30 and branch circuits (not shown) that are branched from the main circuit and constitute multiple systems. The distribution board 32 therefore forms a distribution network in the customer facility 1 to allow power received from the power grid 30 to be supplied to the electric loads 2 connected to the multiple systems.

The power generated by the photovoltaic power generation apparatus 211 is supplied to the electric loads 2. When the power generated by the photovoltaic power generation apparatus 211 is greater than the power consumed by the electric loads 2 to result in producing surplus power, the surplus power would be used for charging the storage battery of the power storage apparatus 22, or the surplus power would be supplied to the power grid 30. Note that, in the present embodiment described herein, when surplus power is produced by the photovoltaic power generation apparatus 211, the surplus power is used preferentially for charging the power storage apparatus 22 although the surplus power can be supplied to the power grid 30 as described above. Note that when the remaining energy of the power storage apparatus 22 has reached a scheduled amount of energy, the surplus power is supplied to the power grid 30.

The efficiency of power generation of the photovoltaic power generation apparatus 211 is affected by the weather conditions such as the amount of solar radiation and the ambient temperature. The surplus power produced depending on the weather condition will be used for charging the power storage apparatus 22 or be supplied to the power grid 30 in accordance with the above mentioned rule. In a case where the surplus power of the photovoltaic power generation apparatus 211 cannot be used for charging the power storage apparatus 22 and also is not allowed to be supplied to the power grid 30, the power supply from the photovoltaic power generation apparatus 211 to the power grid 30 is not performed.

In the embodiment, a control of a charging period and a discharging period of the storage battery included in the power storage apparatus 22 and a control of a battery level of the storage battery are performed by the controller 15. Switching between the first state of supplying (flowing back) power from the power storage apparatus 22 to the power grid 30 and the second state of supplying power from the power storage apparatus 22 to the electric loads 2 is performed by the controller 15 by way of switching a selector (not shown) which is built in the distribution board 32.

The first state is typically selected for the purpose of allowing power to flow back to the power grid 30 in response to a demand from the electric utility. The person of the customer facility 1 can receive a return proper to the amount of energy flowed back from the power storage apparatus 22 to the power grid 30, from the electric utility or the service provider.

The second state is typically selected for the purpose of reducing the amount of energy received from the power grid 30. Even when there is a shortfall in the amount of energy generated by the photovoltaic power generation apparatus 211 compared to the amount of energy consumed by the electric loads 2, the electric loads 2 can be powered without receiving power from the power grid 30 by supplying energy from the power storage apparatus 22 to the electric loads 2 to compensate for the shortfall. Also, in a case where a cap is set on the energy received from the power grid 30, electricity may be supplied from the storage apparatus 22 to the electric loads 2 so that the energy received from the power grid 30 does not exceed the cap.

The distribution board 32 is provided with the measurement device 31 for measuring respective energy passing through the main circuit and the branch circuits. The measurement device 31 includes: the first measurement device 311 for measuring the energy generated by the photovoltaic power generation apparatus 211; and the second measurement device 312 for measuring the energy consumed by the electric loads 2. Alternatively, the values of the energy passing through the branch circuits may be respectively measured with measurement units (not shown) provided separately from the distribution board 32.

Desirably, the measurement device 31 is composed of an electronic electricity meter including: current sensors (not shown) each of which measures a current flowing through an interested circuit; and a calculator (not shown) for calculating energy with regard to each interested circuit based on a value of a line voltage of the interested circuit and a current value measured with a current sensor. According to the present embodiment, the measurement device 31 does not necessarily measure the energy passing through the respective branch circuits, as long as the measurement device 31 is able to measure at least the energy generated by the photovoltaic power generation apparatus 211 and total energy consumed by the electric loads 2.

Incidentally, the energy generated by the photovoltaic power generation apparatus 211 as well as the energy consumed by the electric loads 2 vary from hour to hour. Therefore, there may exist such a period in which the energy generated by the photovoltaic power generation apparatus 211 falls short of the energy consumed by the electric loads 2. For example, in the night time, no power can be generated by the photovoltaic power generation apparatus 211. Also, the efficiency of power generation of the photovoltaic power generation apparatus 211 would be small in cloudy hours, in comparison with that in sunny hours.

It is therefore necessary that the electric loads 2 receive power from the power grid 30 or the power storage apparatus 22 during a time period in which the energy generated by the photovoltaic power generation apparatus 211 falls short of the energy consumed by the electric loads 2. However, some cost would be required for receiving power from the power grid 30. Therefore, it is desirable that power is supplied from the power storage apparatus 22 to the electric loads 2 as possible.

The energy generated by the photovoltaic power generation apparatus 211 per unit time tends to gradually increase after around the time of dawn, becomes a maximum in the daytime; and thereafter decreases toward the time of sunset. Meanwhile, the energy consumed by the electric loads 2 per unit time varies in accordance with the usage of the electric loads 2 of the customer facility 1. In one case, the energy per unit time shows a maximum in morning time and at night, and in another case, shows a further maximum in the daytime.

In this regard, in the embodiment, one day is divided into comparatively short time periods (selected from 10 minutes, 30 minutes, one hour, and the like), each time period is defined as an interested period, and comparison between respective energy is done for each interested period. In other words, a comparatively short period is defined as the interested period, and multiple interested periods which cover a desired period of one day are stored in the measurement device 31. Comparison between the respective energy is done by the measurement device 31 with regard to each interested period. The interested periods are not necessarily set so as to cover a whole of one day (24 hours), but may be set so as to cover a limited period of one day, such as a period from the time of dawn to the time of sunset. In an example in which the time of dawn is at 6:00 and the time of sunset is 18:00, and the length of each interested period is set to 30 minutes, the number of interested periods of one day is 24.

The interested period is set for comparing the energy generated by the photovoltaic power generation apparatus 211 with the energy consumed by the electric loads 2. Excess or insufficiency regarding the energy in each interested period can be determined based on the respective energy measured with the measurement device 31, but the determined results of excess or insufficiency thereof are merely related to past events. It is not possible to determine whether power should be supplied from the power storage apparatus 22 in future.

In this regard, there are provided: the first estimator 11 for estimating energy (first energy) to be generated by the photovoltaic power generation apparatus 211 during an interested period; and the second estimator 12 for estimating energy (second energy) to be consumed by the electric loads 2 of the customer facility 1 during the interested period. The first estimator 11 and the second estimator 12 estimate the respective energy regarding a same interested period.

When there is a shortfall in the first enemy compared to the second energy, power is needed to be supplied from the power grid 30 or the power storage apparatus 22 in order to compensate for the energy corresponding to the shortfall ("third energy"="second energy"-"first energy"). The third energy is defined as an absolute value of a value obtained by subtracting the first energy from the second energy.

When receiving the third energy from the power grid 30, the person of the customer facility 1 needs to pay a cost of the received energy. In the case where a cap is set on the energy received from the power grid 30, an excess charge may be demanded in addition to the cost of the received enemy. In this regard, the power adjustment system 10 includes the power purchasing cost calculator 13 for calculating a cost need to be payed when the energy is supplied from the power grid 30. In short, when it is expected that there is a shortfall in the energy to be generated by the photovoltaic power generation apparatus 211 compared to the energy to be consumed by the electric loads 2 in any of the interested periods, the power purchasing cost calculator 13 calculates a cost to be paid for receiving the energy for compensating for the shortfall from the power grid 30 in this shortfall-expected interested period. Note that the above defined "any of the interested periods" is at least one of the interested periods regarding which the first estimator 11 and the second estimator 12 estimate the respective energy. The cost calculated by the power purchasing cost calculator 13 is a cost to be paid by the person of the customer facility 1 for receiving the third energy from the power grid 30. Hereinafter, the cost is referred to as "amount of second money". That is, when it is determined that there is a shortfall in the first energy compared to the second energy, the power purchasing cost calculator 13 calculates, as the amount of the second money, a cost for purchasing the third energy.

In the present embodiment, the power supply apparatus 20 provided in the customer facility 1 is allowed to cause power to flow back to the power grid 30, and the person of the customer facility 1 can receive from the electric utility a reward for the power flowed back. The price of money paid for the power flowed back may be set to a constant value in some cases, but in a following case, the price of money paid for the power flowed back is determined based on a relation between supply and demand of power.

According to this case, when there is a demand for power, information about a requested energy (hereinafter referred to as "exchanging energy"), a price of unit amount of power (hereinafter referred to as "unit price"), and a period during which power is requested to be supplied (hereinafter referred to as "interested period") can be obtained from the trading device 40. Power trade will be conducted based on this information. Such information is recorded on the trading device 40 managed by the electric utility. The information (hereinafter referred to as "trading term") recorded on the trading device 40 is updated timely. Desirably, the trading term(s) is updated no later than a previous day of start of an interested period, or no later than a noon of a day of start of an interested period. However, when a demand of power is urgent, the trading device 40 may allow an entry of a trading term regarding this demand immediately before the start of the interested period. The electric utility that manages the trading device 40 is, desirably, a service provider that provides a service regarding electricity trade.

The power adjustment system 10 includes an information receiver 14 for communicating with the trading device 40 through the telecommunication network NT such as the Internet. The information receiver 14 acquires, from the trading device 40, a trading term(s) containing information about the exchanging energy, the unit price, and the interested period. The trading term(s) recorded on the trading device 40 are updated from hour to hour. The information receiver 14 monitors the change in the recorded trading terms and acquires a desired trading term(s).

In a case where there is a shortfall in the energy to be generated by the photovoltaic power generation apparatus 211 compared to the energy to be consumed by the electric loads 2 and the third energy from the power grid 30 is received for compensating for the shortfall, the person of the customer facility 1 needs to pay some cost, as described above. In an alternative case where the third energy is supplied from the power storage apparatus 22 to the electric loads 2, no cost would be demanded. However in this case, no income would be received in contrast to a case where the energy stored in the power storage apparatus 22 is supplied to the power grid 30.

In the present embodiment, therefore, the determiner 16 compares the amount of money (income) that can be received when the third energy is supplied from the power storage apparatus 22 to the power grid 30, with a cost to be paid for receiving the third energy from the power grid 30, and controls the controller 15 so that the loss of the person of the customer facility 1 can be minimized. In short, the power adjustment system 10 includes: the controller 15 for selecting one of the first state of supplying power from the power storage apparatus 22 to the power grid 30 and the second state of supplying power to the electric loads 2; and the determiner 16 for determining loss and gain for respective cases of selecting the first state and the second state.

The determiner 16 compares a possible income (amount of first money) to be obtained when the controller 15 selects the first state for supplying the third energy from the power storage apparatus 22 to the power grid 30, with a possible cost (amount of second money) to be paid by the person of the customer facility 1 for receiving the third energy from the power grid 30. When the determiner 16 determines that the amount of the first money is equal to or less than the amount of the second money, the controller 15 selects the second state of supplying power from the power storage apparatus 22 to the electric loads 2. In short, when the amount of first money expected to be received as a result of selecting the first state of supplying power from the power storage apparatus 22 to the power grid 30 is equal to or less than the amount of the second money needed to be paid as a result of selecting the second state of receiving power from the power grid 30, the controller 15 selects the second state. When the second state is selected, power supplied from the power storage apparatus 22 compensates for at least part of power consumed by the electric loads 2. In other words, the determiner 16 compares income (amount of first money) to be obtained when the third energy is sold and a cost (amount of second money) needed to be paid for purchasing the third energy. A comparison result indicating that the cost is equal to or greater than the income means monetary loss. In this case, therefore, the determiner 16 controls the controller 15 to compensate for the shortfall in power by using the power stored in the power storage apparatus 22 namely, selects the second state).

When the determination result made by the determiner 16 indicates that the amount of the first money exceeds the amount of the second money, the trade attender 17 submits an offer to the trading device 40 through the telecommunication network NT. In detail, when more profit is expected to be given to the person of the customer facility 1 by supplying the third energy from the power storage apparatus 22 to the power grid 30 in accordance with a trading term advertised by the trading device 40, the trade attender 17 submits an application for a trade.

When receiving an application to trading under a certain trading term from only one power storage apparatus 22, the trading device 40 determines to establish a contract with a customer facility 1 including this power storage apparatus 22. When receiving two or more applications to trading under a trading term, the trading device 40 negotiates a price with two or more trade attenders 17. When agreement for prices is made, the trading device 40 establishes a contract under this trading term. The trading device 40 sends a determination result of whether or not a contract is established to the trade attender(s) 17 through the telecommunication network NT.

The trade attender 17 receives the determination result of whether or not a contract is established from the trading device 40, in a case where a contract is established, the trade attender 17 instructs the controller 15 to select the first state of supplying power from the power storage apparatus 22 to the power grid 30. In this case, the person of the customer facility 1 can receive, from the electric utility, a reward for supplying the third energy from the power storage apparatus 22 to the power grid 30. In a case where no established contract is received, the trade attender 17 instructs the controller 15 to select the second state of supplying power from the power storage apparatus 22 to the electric loads 2.

In order to estimate the amount of the second money described above, the first estimator 11 estimates the energy to be generated by the photovoltaic power generation apparatus 211 during an interested period, and the second estimator 12 estimates the energy to be consumed by the electric loads 2 during the interested period. Each of the first estimator 11 and the second estimator 12 estimates energy in the interested period based on a temporal change in an actually measured power.

In this regard, there are provided: the first measurement device 311 for measuring the energy generated by the photovoltaic power generation apparatus 211; and the second measurement device 312 for measuring the energy consumed by the electric loads 2. The first measurement device 311 and the second measurement device 312 measure the respective energy at comparatively short intervals (for example, selected from 30 seconds, one minute, five minutes, and the like). Average of the measured energy for one second may be regarded as an instantaneous power.

The first estimator 11 receives data on a temporal change in power from the first measurement device 311, and estimates the energy to be generated by the photovoltaic power generation apparatus 211 during the interested period. Also, the second estimator 12 receives data on a temporal change in power from the second measurement device 312, and estimates the energy to be consumed by the electric loads 2 during the interested period. Note that when a period during which the first measurement device 311 or the second measurement device 312 measures energy is close to an interested period, the first estimator 11 or the second estimator 12 can estimate the energy to be consumed during the interested period based on a simple estimation technique such as a linear prediction.

However, the linear prediction shows a comparatively large error when a condition varies widely. It is therefore desirably that each of the first estimator 11 and the second estimator 12 estimates energy during the interested period based on the temporal change in the energy, instead of the linear prediction.

The first estimator 11 includes the weather information receiver 111 for obtaining information about the forecasted weather, and the first history storage 112 for storing the information obtained by the weather information receiver 111 and the history of power generated by the photovoltaic power generation apparatus 211 in association with each other. The first estimator 11 further includes the first classifier 113 for creating the change patterns of power based on the history of power stored in the first history storage 112.

The weather information receiver 111 obtains the information about the forecasted weather, desirably through the telecommunication network NT such as the Internet. The weather information receiver 111 may obtain information about an actual weather in a past time if it is possible to obtain the information about the actual weather in the past time, in addition to the information about the forecast. Desirably, the information about the weather includes at least the amount of solar radiation and the ambient temperature.

The first history storage 112 stores the information about the forecasted weather, and the history of the power measured with the first measurement device 311 with time, in association with each other. It is possible to extract a relation between the history of power actually generated by the photovoltaic power generation apparatus 211 and the information about the forecasted weather, based on the information stored in the first history storage 112.

The first classifier 113 creates the change patterns of power with regard to each time period, which corresponds to an interested period, of days, based on the information stored in the first history storage 112. For example, relations between a tendency of a change in power and the information about the weather are classified with regard to each of time periods such as "11:30 to 12:00", "12:00 to 12:30" and the like.

The first estimator 11 checks data on the temporal change in power received from the first measurement device 311 against the change patterns created by the first classifier 113 to estimate power to be generated by the photovoltaic power generation apparatus 211 during the interested period, The second estimator 12 includes the second history storage 121 for storing the history of power consumed by the electric loads 2, and the second classifier 122 for creating the change patterns of power based on the history of power stored in the second history storage 121. That is, the first estimator 11 includes the weather information receiver 111 for obtaining the information about the forecasted weather, but the second estimator 12 differs therefrom in this point and does not use the information about the weather.

The second history storage 121 stores the history of power measured with the second measurement device 312 and time in association with each other. The second classifier 122 creates the change patterns of power with regard to each time period, which corresponds to an interested period, of days, based on the information stored in the second history storage 121. The second estimator 12 checks data on the temporal change in power received from the second measurement device 312 against the change patterns created by the second classifier 122 to estimate the energy to be consumed by the electric loads 2 during the interested period.

Incidentally, in a case where the controller 15 is to select the first state of supplying power from the power storage apparatus 22 to the power grid 30, it is required that the third energy can be supplied from the power storage apparatus 22. It is therefore desirably that the power storage apparatus 22 is, before a start time of an interested period in which a shortfall in the first energy compared to the second energy is expected, charged so that stored energy of the power storage apparatus 22 exceeds the third energy. That is, the power supply apparatus 20 charges the power storage apparatus 22 such that the stored energy of the storage battery of the power storage apparatus 22 exceeds the third energy before the start time of the interested period in which the energy to be generated by the photovoltaic power generation apparatus 211 is expected to be short of the energy to be consumed by the electric loads 2.

There is a possibility that there are two or more successive interested periods in which the energy to be generated by the photovoltaic power generation apparatus 211 is expected to be insufficient for the energy to be consumed by the electric loads 2. The power supply apparatus 20 estimates required energy based on the total energy to be insufficient in these successive interested periods (that is, a sum of the respective amount of energy to be insufficient in the successive interested periods), and determines the energy to be stored in the power storage apparatus 22. It should be noted that, when the power storage apparatus 22 is charged by the power generated by the photovoltaic power generation apparatus 211, no cost would be demanded for charging the power storage apparatus 22 but, when the power storage apparatus 22 is charged by the power received from the power grid 30, it is necessary to take the cost to be paid for receiving the energy into consideration.

In a case where the required energy can be charged in the power storage apparatus 22 through the power generated by the photovoltaic power generation apparatus 211 only, the power storage apparatus 22 is charged through the power generated by photovoltaic power generation apparatus 211 only. In a case where the energy consumed by the electric loads 2 cannot be covered by the power generated by the photovoltaic power generation apparatus 211, the power supply apparatus 20 charges the power storage apparatus 22 also using the power received from the power grid 30. In this case, the power purchasing cost calculator 13 regards the third energy into which the energy received from the power grid 30 is incorporated as third energy, and calculates a cost of the resultant third energy. The power purchasing cost calculator 13 calculates the cost based on a power purchasing unit price for receiving power. Alternatively, the power purchasing cost calculator 13 may not incorporate the energy received from the power grid 30 into the third energy and ignore a cost of the received energy, even when the power storage apparatus 22 is charged using the power received from the power grid 30.

Hereinbelow, the trading device 40 is explained in brief. The trading device 40 includes an information storage (trading table) having fields, which is shown in FIG. 2 for example, for recording trading terms. The information storage stores data of a trading term(s) which includes an interested period, a unit price, and an exchanging energy. The unit price and the exchanging energy are associated with each other and recorded in the information storage in a pair, and one or more pairs can be recorded with regard to each interested period. In other words, the information storage includes multiple (fifteen or thirty) storage regions each having a pair of fields for the unit price and the exchanging energy, with regard to each interested period. Note that, all the storage regions are not filled with pairs of unit price and exchanging energy, with regard to each interested period. There may be an interested period which is not associated with a pair of unit price and exchanging energy.

As shown in FIG. 3, interested periods each having a unit time of 30 minutes are recorded in the information storage. In the illustrated example, one day is divided into 48 interested periods. In the example of FIG. 3, the unit price and the exchanging energy are shown in the upper and lower tiers, respectively. The exchanging energy is shown in terms of 1000 kWh per hour basis, and the unit price is shown in terms of "yen" per 1 kWh. For considering 30 minutes basis, half values of the lower tiers should be used. A participator, who would like to perform an electricity trade, registers information about an amount of energy and a unit price in the information storage.

In the information storage, a participator who would like to purchase power registers information about a requesting energy and a unit price, and a participator who would like to sell power registers information about a supplying energy and a unit price. With regard to the exchanging energy, a positive value indicates a request for purchasing power, and a negative value indicates a request for selling power. In the example of FIG. 3, a numeral with a symbol "▲" indicates a negative value. Therefore, during an interested period which includes at least one numeral with the symbol "▲", flowing back of power can be performed.

In a case where multiple pairs of exchanging energy and unit price are allowed to be registered with regard to one interested period, a participator who would like to purchase power would determine the multiple pairs so that the unit price decreases with an increase in the exchanging energy. Also, in the case where multiple pairs of exchanging energy and unit price are allowed to be registered with regard to one interested period, a participator who would like to sell power would determine the multiple pairs so that the unit price increases with an increase in the exchanging energy. That is, a buyer of power would reduce the energy to be purchased with an increase in the unit price to reduce the cost. On the other hand, a seller of power would increase the energy to be sold with an increase in the unit price to increase the profit.

The trading device 40 includes information storages allocated to the respective participators of the electricity trade. In the following, it is assumed that there are three participators "A", "B", and "C" in order to simplify the explanation. In the example shown in FIG. 4, the participators "A" and "B", who register exchanging energy having positive values, hope to purchase power, and the participator "C", who registers values of exchanging energy having negative values, hopes to sell power. In the illustrated example, an interested period of "14:00 to 14:30" having thirty minutes length is considered.

As described above, the buyer of power would reduce the cost as possible, and the seller of power would increase the income as possible. With regard to the buyer of power, a value of exchanging energy set in a field of the information storage indicates an amount of energy to be purchased when a determined price is equal to or less than the unit price paired with this exchanging energy. With regard to the seller of power, a value of an exchanging energy set in a field of the information storage indicates an amount of energy to be sold when a determined price is equal to or more than the unit price paired with this exchanging energy.

In the illustrated example, the buyer of power includes the participators "A" and "B". Therefore, relation between the exchanging energy and the unit price are determined, using the values in the information storage of the participator "A" and the values in the information storage of the participator "B". A relation between the exchanging energy and the unit price with regard to a combination of the participator "A" and the participator "B" is shown in FIG. 5.

Figure 6:
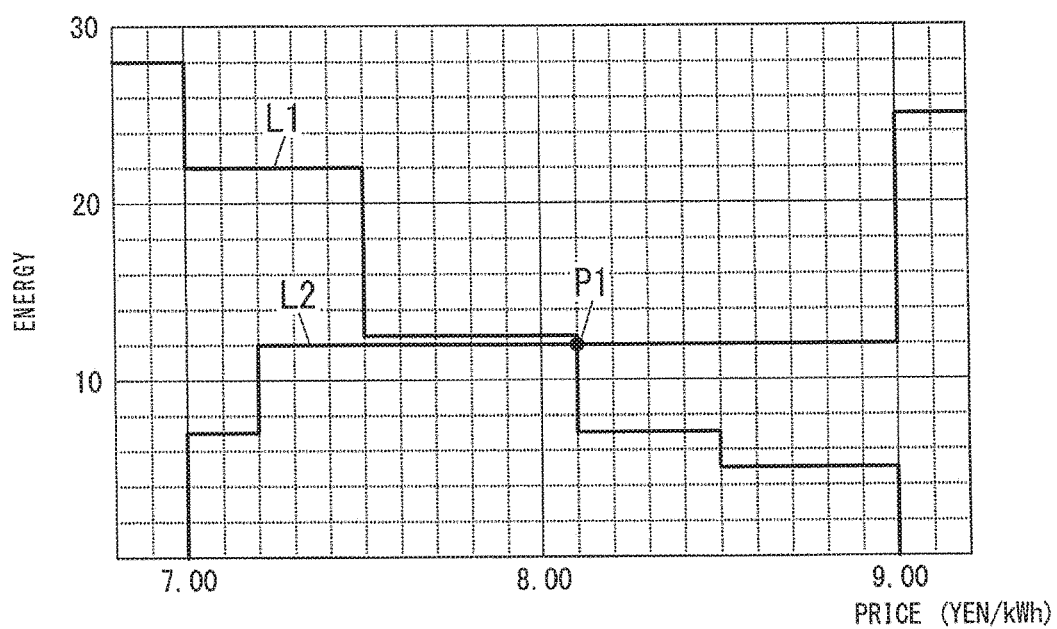
FIG. 6 is a diagram for illustrating a method how to establish a contract according to the embodiment.

As illustrated by a solid line L1 (demand line L1) in FIG. 6, the exchanging energy which indicates the amount of energy to be purchased per hour basis is 28000 kWh when the unit price is equal to or less than 7.00 yen. The exchanging energy which indicates the amount of energy to be purchased per hour basis is 22000 kWh when the unit price is above 7.00 yen but equal to or less than 7.50 yen. The exchanging energy is 13000 kWh when the unit price is above 7.50 yen but equal to or less than 8.10 yen. The exchanging energy is 7000 kWh when the unit price is above 8.10 yen but equal to or less than 8.50 yen. The exchanging energy is 5000 kWh when the unit price is above 8.50 yen but equal to or less than 9.00 yen. Purchasing power would be abandoned when the unit price is above 9.00 yen.

Regarding the participator "C" as the seller, as illustrated by a solid line L2 (supply line L2) in FIG. 6, the exchanging energy which indicates the amount of energy to be sold per hour basis is 7000 kWh or less when the unit price is above 7.00 yen but equal to or less than 7.20 yen. The exchanging energy is 12000 kWh or less when the unit price is above 7.20 yen but equal to or less than 9.00 yen. The exchanging energy is 25000 kWh or less when the unit price is above 9.00 yen. The participator "C" would not sell power when the unit price is equal to or less than 7.00 yen.

For summarizing the above relations, FIG. 6 shows a relation between a purchasing energy as the exchanging energy and the unit price with regard to the buyer including the participators "A" and "B", and a relation between a selling energy as the exchanging energy and the unit price with regard to the seller including the participator "C". The lines indicating the relations between the exchanging energy and the unit price includes a line related to the buyer which is referred to as "demand line L1", and a line related to the seller which is referred to as "supply line L2". Referring to the lines, an intersection point P1 of the demand line L1 and the supply line L2 indicates a point at which the exchanging energy demanded by the buyer is equal to the exchanging energy which the seller can supply. According to the relations shown in FIG. 6, a contract is established with a term of the exchanging energy of 1200 kWh per hour basis and the unit price of 8.10 yen per 1 kWh.

Therefore, a contract is established between the participators "A", "B", and "C", such that the exchanging energy per hour basis of 12000 kWh is traded therebetween with a price of 8.10 yen per 1 kWh during a time period of 14:00 to 14:30. In the example, the total of the exchanging energy requested by the participators "A" and "B" as the buyer is 13000 kWh, but the energy which the participator "C" can sell is 12000 kWh. Therefore, there is a shortfall of 1000 kWh. The power compensating for the shortfall will be supplied in another way.

The above described trading example is a mere example, and in an actual case, there would exist many participators and thus a lot of alternative contracts would be possibly established. It is therefore desirable that an appropriate contract is selected in accordance with an algorithm capable of obtaining a certainly suitable solution within a finite time, such as a probabilistic algorithm and genetic algorithm.

In the example describe above, each of the demand line L1 and the supply line L2 is expressed by a polygonal line constituted by a combination of line segments, but may be expressed by a smooth and continuous curved line. The relation between the demand line L1 and the supply line L2 is determined in accordance with respective environmental conditions of the buyer and the seller. Examples of the environmental condition include financial power of the buyer and/or the seller, degree of urgency of demand of the power, and the like.

The above described example is related to a case where the exchanging energy is relatively large. Contrary, in a case where a person of a customer facility including a relatively small-scale power storage apparatus 22 with a capacity of around 5 kWh, such as a detached house, participates in an electricity trade, it is desirable that power of multiple customer facilities are dealt collectively by an electricity aggregator. Also, when there is a shortfall in the exchanging energy to be purchased required by the buyer compared to the exchanging energy which the seller can sell as in the above described case, power for compensating for the shortfall may be supplied from the small-scale power storage apparatus 22.

The first estimator 11, the second estimator 12, the power purchasing cost calculator 13, the information receiver 14, the controller 15, the determiner 16, and the trade attender 17 can be provided in the customer facility 1 as in the configuration example described above. However, the above elements other than the controller 15 may be provided separately from the customer facility 1. Alternatively, the power purchasing cost calculator 13, the information receiver 14, and the trade attender 17 may be provided separately from the customer facility 1. The elements provided separately from the customer facility 1 may be provided in a web server or on a cloud computing system. In this case, communication interfaces may be provided in order to transmit and receive information between the element(s) provided in the customer facility 1 and the element(s) provided separately from the customer facility 1.

In the embodiment described above, the participator who would like to trade power registers a value of energy and a unit price in the information storage of the trading device 40, but alternatively may register a power value and a unit price in the information storage. The power value to be registered in the information storage indicates power to be supplied from the power supply apparatus 20 per unit time. The power storage apparatus 22 is stationary situated in the customer facility in the above described configuration example, but the storage battery of the power storage apparatus 22 may be a storage battery of an electric vehicle.

In the configuration example described above, power is supplied from the power storage apparatus 22 to the electric loads 2 when it is determined that income to be received when the power of the power storage apparatus 22 is supplied to the power grid 30 is equal to or less than a cost need to be paid for receiving power from the power grid 30. However, other conditions may be further taken into consideration for finally determining the operation state of the power storage apparatus 22 and the supply destination of power of the power storage apparatus 22.

The invention claimed is:

1. A power adjustment system configured to make a deal with a trading device about supplying power to a power grid from a power supply apparatus of a customer facility in accordance with a trade term,
   the power supply apparatus including a power generation apparatus, and a power storage apparatus including a storage battery,
   the power adjustment system comprising:
   a first estimator configured to estimate first power to be generated by the power generation apparatus during an interested period;
   a second estimator configured to estimate second power to be consumed by an electric load of the customer facility during the interested period;
   a power purchasing cost calculator configured to, when there is a shortfall in the first power estimated by the first estimator compared to the second power estimated by the second estimator, calculate a cost to be paid by the customer facility for receiving third power for compensating for the shortfall from the power grid;
   a controller configured to select one of a first state of supplying power from the power storage apparatus to the power grid and a second state of supplying power from the power storage apparatus to the electric load; and
   a determiner configured to compare an amount of first money to be paid to the customer facility in accordance with the trade term when the first state is selected, with an amount of second money equal to the cost calculated by the power purchasing cost calculator,
   the controller being configured to select the second state when a comparison result made by the determiner indicates that the amount of the first money is equal to or less than the amount of the second money,
   the controller being configured to predict, based on the first power estimated by the first estimator and the second power estimated by the second estimator, an occurrence of a power shortfall period which is an interested period to be expected that the first power becomes smaller than the second power,
   the controller being configured to control the power storage apparatus to be charged, before a start time of the power shortfall period, so that an amount of remaining power thereof exceeds the third power in response to the predicted occurrence of the power shortfall period.

2. The power adjustment system of claim 1, further comprising a trade attender configured to, when a comparison result made by the determiner indicates that the amount of the first money is greater than the amount of the second money, submit an offer to the trading device and receive from the trading device a determination result that indicates whether or not a contract is established,
   wherein the controller is configured to select the first state when the contract is established.

3. The power adjustment system of claim 1, wherein
   the first estimator is configured to receive, from a first measurement device, data on power generated by the power generation apparatus, and estimate power to be generated by the power generation apparatus during the interested period based on a temporal change in power measured with the first measurement device, and
   the second estimator is configured to receive, from a second measurement device, data on power consumed by the electric load of the customer facility, and estimate power to be consumed by the electric load during the interested period based on a temporal change in power measured with the second measurement device.

4. The power adjustment system of claim 3, wherein
   the power generation apparatus is composed of a photovoltaic power generation apparatus,
   the first estimator includes:
   a weather information receiver configured to obtain information about a forecasted weather;
   a first history storage configured to store the information obtained by the weather information receiver and a history of power generated by the photovoltaic power generation apparatus in association with each other; and
   a first classifier configured to create change patterns of power based on the history of power stored in the first history storage,
   the first estimator is configured to check data on a temporal change in power received from the first measurement device against the change patterns created by the first classifier to estimate power to be generated by the photovoltaic power generation apparatus during the interested period,
   the second estimator includes:
   a second history storage configured to store a history of power consumed by the electric load; and
   a second classifier configured to create change patterns of power based on the history of power stored in the second history storage, the second estimator is configured to check data on a temporal change in power received from the second measurement device against the change patterns created by the second classifier to estimate power to be consumed by the electric load during the interested period.

5. A power adjustment method for making a deal with a trading device about supplying power to a power grid from a power supply apparatus of a customer facility in accordance with a trade term, the power supply apparatus including a power generation apparatus, and a power storage apparatus including a storage battery, the power adjustment method comprising:

estimating, by a first estimator, first power to be generated by the power generation apparatus during an interested period;

estimating, by a second estimator, second power to be consumed by an electric load of the customer facility during the interested period;

when there is a shortfall in the first power estimated by the first estimator compared to the second power estimated by the second estimator, calculating, by a power purchasing cost calculator, a cost to be paid by the customer facility for receiving third power for compensating for the shortfall from the power grid;

comparing, by a determiner, an amount of first money to be paid to the customer facility in accordance with the trade term when a first state of supplying power from the power storage apparatus to the power grid is selected, with an amount of second money equal to the cost calculated by the power purchasing cost calculator;

when a comparison result made by the determiner indicates that the amount of the first money is equal to or less than the amount of the second money, selecting, by a controller, a second state of supplying power from the power storage apparatus to the electric load;

based on the first power estimated by the first estimator and the second power estimated by the second estimator, predicting an occurrence of a power shortfall period which is an interested period to be expected that the first power becomes smaller than the second power, and before a start time of the power shortfall period, charging the power storage apparatus so that an amount of remaining power thereof exceeds the third power in response to the predicted occurrence of the power shortfall period.

6. A non-transitory computer-readable storage medium which stores a program that when executed on a computer, causes the computer to function as a power adjustment system, wherein the power adjustment system is configured to make a deal with a trading device about supplying power to a power grid from a power supply apparatus of a customer facility in accordance with a trade term, the power supply apparatus including a power generation apparatus, and a power storage apparatus including a storage battery, the power adjustment system comprising:

a first estimator configured to estimate first power to be generated by the power generation apparatus during an interested period;

a second estimator configured to estimate second power to be consumed by an electric load of the customer facility during the interested period;

a power purchasing cost calculator configured to, when there is a shortfall in the first power estimated by the first estimator compared to the second power estimated by the second estimator, calculate a cost to be paid by the customer facility for receiving third power for compensating for the shortfall from the power grid;

a controller configured to select one of a first state of supplying power from the power storage apparatus to the power grid and a second state of supplying power from the power storage apparatus to the electric load; and a determiner configured to compare an amount of first money to be paid to the customer facility in accordance with the trade term when the first state is selected, with an amount of second money equal to the cost calculated by the power purchasing cost calculator, the controller being configured to select the second state when a comparison result made by the determiner indicates that the amount of the first money is equal to or less than the amount of the second money, the controller being configured to predict, based on the first power estimated by the first estimator and the second power estimated by the second estimator, an occurrence of a power shortfall period which is an interested period to be expected that the first power becomes smaller than the second power, and the controller being configured to control the power storage apparatus to be charged, before a start time of the power shortfall period, so that an amount of remaining power thereof exceeds the third power in response to the predicted occurrence of the power shortfall period.

* * * * *